(12) United States Patent
Hensley

(10) Patent No.: US 7,475,530 B2
(45) Date of Patent: Jan. 13, 2009

(54) ARTICULATING SWING-OUT ARM

(75) Inventor: Ryan Lee Hensley, Pineville, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/681,236

(22) Filed: Mar. 2, 2007

(65) Prior Publication Data
US 2008/0209882 A1 Sep. 4, 2008

(51) Int. Cl.
*A01D 34/53* (2006.01)
(52) U.S. Cl. ........................................................ 56/249
(58) Field of Classification Search ................ 56/14.9, 56/7, 6, 13.6, 249, 11.9, 9; 280/411.1; 172/314, 172/439, 272
See application file for complete search history.

(56) References Cited

U.S. PATENT DOCUMENTS

| | | | |
|---|---|---|---|
| 436,912 A | 9/1890 | Branson | |
| 750,827 A | 2/1904 | Dennis | |
| 784,663 A | 3/1905 | Dennis | |
| 1,401,156 A | 12/1921 | Jenkins | |
| 1,772,329 A | 8/1930 | Wallace et al. | |
| 2,067,158 A | 1/1937 | Moyer | |
| 2,099,902 A * | 11/1937 | Moyer et al. | 56/7 |
| 2,139,200 A * | 12/1938 | Moyer | 56/7 |
| 2,143,473 A | 1/1939 | Brown | |
| 2,292,962 A | 8/1942 | Mott | |
| 2,417,613 A | 3/1947 | Radabaugh | |
| 2,483,772 A | 10/1949 | Holmes | |
| 2,539,934 A | 1/1951 | Smith et al. | |
| 2,603,050 A | 7/1952 | Scheer | |
| 2,603,932 A | 7/1952 | Tom | |
| 2,734,326 A | 2/1956 | Gebhart | |
| 2,870,592 A | 1/1959 | Swanson | |

(Continued)

FOREIGN PATENT DOCUMENTS

FR 2768294 3/1999

(Continued)

OTHER PUBLICATIONS

"Keep Your Collars Neat"; USGA Journal and Turf Management; Aug. 1954; p. 30.

(Continued)

*Primary Examiner*—Árpád Fábián-Kovács
(74) *Attorney, Agent, or Firm*—Harness, Dickey & Pierce, PLC

(57) ABSTRACT

A lawn mower, in particular a reel lawn mower, can include an articulating swing-out arm for supporting a reel assembly. The swing-out arm can include main and secondary members. The main member and the mower can be coupled to a first joint assembly which can define a first axis therethrough and can be operable to provide for rotation of the main member relative to the mower about the first axis. The main and secondary members can be coupled to a second joint assembly which can define a second axis therethrough and can be operable to provide for rotation of the secondary member relative to the main member about the second axis. The secondary member can also be coupled to the reel assembly. The swing-out arm can be operable to locate the reel assembly in a mowing position underneath the mower and a servicing position outside of the mower.

16 Claims, 5 Drawing Sheets

U.S. PATENT DOCUMENTS

| | | | |
|---|---|---|---|
| 2,936,561 A * | 5/1960 | Grimes | 56/7 |
| 3,038,286 A * | 6/1962 | Hall | 56/7 |
| RE25,379 E | 5/1963 | Swanson | |
| 3,090,184 A | 5/1963 | Hadek | |
| 3,103,090 A | 9/1963 | Campbell | |
| 3,106,811 A | 10/1963 | Heth et al. | |
| 3,197,948 A | 8/1965 | Danford | |
| 3,217,824 A | 11/1965 | Jepson | |
| 3,230,695 A | 1/1966 | West | |
| 3,339,353 A | 9/1967 | Schreyer | |
| 3,404,516 A | 10/1968 | Carlson | |
| 3,404,518 A | 10/1968 | Kasper | |
| 3,425,197 A | 2/1969 | Kita | |
| 3,429,110 A | 2/1969 | Strasel | |
| 3,472,005 A | 10/1969 | Profenna | |
| 3,496,706 A | 2/1970 | Mattson | |
| 3,511,033 A | 5/1970 | Strasel | |
| 3,511,034 A | 5/1970 | Strasel | |
| 3,511,035 A | 5/1970 | Strasel | |
| 3,514,926 A * | 6/1970 | Heth et al. | 56/7 |
| 3,528,228 A | 9/1970 | van der Lely et al. | |
| 3,550,360 A | 12/1970 | van der Lely | |
| 3,550,364 A | 12/1970 | Musgrave | |
| 3,563,012 A | 2/1971 | Strasel | |
| 3,570,226 A | 3/1971 | Haverkamp et al. | |
| 3,572,455 A | 3/1971 | Brueske | |
| 3,579,965 A | 5/1971 | Musgrove | |
| 3,581,480 A | 6/1971 | O'Connor, III et al. | |
| 3,599,406 A | 8/1971 | Akgulian et al. | |
| 3,602,772 A | 8/1971 | Hundhausen et al. | |
| 3,603,065 A | 9/1971 | Weber | |
| 3,608,284 A | 9/1971 | Erdman | |
| 3,608,285 A | 9/1971 | Berk | |
| 3,612,573 A | 10/1971 | Hoffman | |
| 3,613,337 A | 10/1971 | Akgulian et al. | |
| 3,631,659 A | 1/1972 | Horowitz et al. | |
| 3,641,749 A | 2/1972 | Dwyer, Jr. et al. | |
| 3,650,097 A | 3/1972 | Nokes | |
| 3,654,750 A | 4/1972 | van der Lely et al. | |
| 3,665,685 A | 5/1972 | Allard | |
| 3,668,844 A | 6/1972 | Akgulian et al. | |
| 3,669,194 A | 6/1972 | Zurek | |
| 3,698,523 A | 10/1972 | Bellinger | |
| 3,716,973 A | 2/1973 | Kidd | |
| 3,717,981 A | 2/1973 | van der Lely et al. | |
| 3,721,076 A | 3/1973 | Behrens | |
| 3,729,910 A | 5/1973 | Hardee | |
| 3,729,912 A | 5/1973 | Weber | |
| 3,731,469 A | 5/1973 | Akgulian et al. | |
| 3,732,671 A | 5/1973 | Allen et al. | |
| 3,732,673 A | 5/1973 | Winn, Jr. | |
| 3,738,682 A * | 6/1973 | Ritter | 280/413 |
| 3,742,685 A | 7/1973 | Lian et al. | |
| 3,751,889 A * | 8/1973 | Overesch | 56/13.6 |
| 3,759,019 A | 9/1973 | Wells | |
| 3,800,480 A | 4/1974 | Keating | |
| 3,809,975 A | 5/1974 | Bartels | |
| 3,832,835 A | 9/1974 | Hall et al. | |
| 3,832,837 A * | 9/1974 | Burkhart et al. | 56/218 |
| 3,841,069 A | 10/1974 | Weck et al. | |
| 3,893,283 A | 7/1975 | Dandl | |
| 3,895,481 A | 7/1975 | Olney et al. | |
| 3,910,016 A | 10/1975 | Saiia et al. | |
| 3,918,240 A | 11/1975 | Haffner et al. | |
| 3,924,389 A | 12/1975 | Kita | |
| 3,958,398 A | 5/1976 | Fuelling, Jr. et al. | |
| 3,992,858 A | 11/1976 | Hubbard et al. | |
| 3,999,643 A | 12/1976 | Jones | |
| 4,015,413 A | 4/1977 | van der Plas et al. | |
| 4,021,996 A | 5/1977 | Bartlett et al. | |
| 4,024,448 A | 5/1977 | Christianson et al. | |
| 4,037,395 A * | 7/1977 | Henkensiefken et al. | 56/218 |
| 4,055,036 A | 10/1977 | Kidd | |
| 4,064,680 A | 12/1977 | Fleigle | |
| 4,065,914 A | 1/1978 | Phillips et al. | |
| 4,113,273 A * | 9/1978 | Gates | 280/413 |
| 4,115,984 A | 9/1978 | Simpson | |
| 4,145,864 A | 3/1979 | Brewster, Jr. | |
| 4,161,858 A | 7/1979 | Gerrits | |
| 4,178,010 A * | 12/1979 | Gerber | 280/412 |
| 4,179,870 A | 12/1979 | Rowse | |
| 4,180,964 A | 1/1980 | Pansire | |
| 4,183,195 A | 1/1980 | James | |
| 4,265,146 A | 5/1981 | Horrell | |
| 4,287,706 A * | 9/1981 | Tobin, Jr. | 56/7 |
| 4,301,881 A | 11/1981 | Griffin | |
| 4,304,086 A | 12/1981 | Stuchl | |
| 4,306,402 A | 12/1981 | Whimp | |
| 4,306,404 A | 12/1981 | Szymanis et al. | |
| 4,307,559 A | 12/1981 | Jupp et al. | |
| 4,318,266 A | 3/1982 | Taube | |
| 4,330,981 A | 5/1982 | Hall et al. | |
| 4,333,302 A | 6/1982 | Thomas et al. | |
| 4,335,569 A | 6/1982 | Keeney et al. | |
| 4,344,639 A | 8/1982 | Pollard et al. | |
| 4,351,557 A | 9/1982 | Chary | |
| 4,354,569 A | 10/1982 | Eichholz | |
| 4,370,846 A | 2/1983 | Arnold | |
| 4,395,865 A | 8/1983 | Davis, Jr. et al. | |
| 4,430,604 A | 2/1984 | Loganbill et al. | |
| 4,445,312 A | 5/1984 | Cartner | |
| 4,479,346 A | 10/1984 | Chandler | |
| 4,487,006 A | 12/1984 | Scag | |
| 4,502,269 A | 3/1985 | Cartner | |
| 4,509,315 A | 4/1985 | Giguere et al. | |
| 4,559,768 A | 12/1985 | Dunn | |
| 4,589,249 A | 5/1986 | Walker et al. | |
| 4,601,162 A | 7/1986 | Wessel et al. | |
| 4,637,625 A | 1/1987 | Blackwell | |
| 4,642,976 A | 2/1987 | Owens | |
| 4,662,646 A * | 5/1987 | Schlapman et al. | 280/462 |
| 4,663,920 A | 5/1987 | Skovhoj | |
| 4,667,460 A | 5/1987 | Kramer | |
| 4,686,445 A | 8/1987 | Phillips | |
| 4,718,221 A | 1/1988 | Wessel et al. | |
| 4,723,402 A | 2/1988 | Webster et al. | |
| 4,723,403 A | 2/1988 | Webster | |
| 4,724,660 A | 2/1988 | Bowie et al. | |
| 4,727,711 A * | 3/1988 | Quataert | 56/16.2 |
| 4,733,525 A | 3/1988 | Pellenc et al. | |
| 4,756,375 A | 7/1988 | Ishikura et al. | |
| 4,761,940 A | 8/1988 | Wolff | |
| 4,763,463 A | 8/1988 | Ermacora et al. | |
| 4,766,803 A | 8/1988 | Cartee et al. | |
| 4,770,595 A | 9/1988 | Thompson et al. | |
| 4,802,327 A | 2/1989 | Roberts | |
| 4,815,259 A | 3/1989 | Scott | |
| 4,823,542 A | 4/1989 | Klever et al. | |
| 4,829,754 A | 5/1989 | Shimamura et al. | |
| 4,838,013 A | 6/1989 | Louet Feisser et al. | |
| 4,860,526 A | 8/1989 | Hottes | |
| 4,866,917 A | 9/1989 | Phillips et al. | |
| 4,869,054 A | 9/1989 | Hostetler et al. | |
| 4,870,811 A | 10/1989 | Steele | |
| 4,873,818 A | 10/1989 | Turner et al. | |
| 4,882,896 A | 11/1989 | Wilcox | |
| 4,893,456 A | 1/1990 | Wallace | |
| 4,896,489 A | 1/1990 | Wykhuis | |
| 4,897,013 A | 1/1990 | Thompson et al. | |
| 4,916,889 A | 4/1990 | Molstad | |
| 4,920,733 A | 5/1990 | Berrios | |
| 4,943,758 A | 7/1990 | Tsurumiya | |
| 4,964,265 A | 10/1990 | Young | |
| 4,964,266 A | 10/1990 | Kolb | |

| | | |
|---|---|---|
| 4,965,990 A | 10/1990 | Slawson, Sr. et al. |
| 4,967,543 A | 11/1990 | Scag et al. |
| 4,969,319 A | 11/1990 | Hutchison et al. |
| 4,972,664 A | 11/1990 | Frey |
| 4,987,729 A | 1/1991 | Paytas |
| 4,991,383 A | 2/1991 | Ermarcora et al. |
| 4,995,227 A | 2/1991 | Foster |
| 5,016,722 A | 5/1991 | Morita et al. |
| 5,035,107 A | 7/1991 | Scarborough |
| 5,042,236 A | 8/1991 | Lamusga et al. |
| 5,042,239 A | 8/1991 | Card |
| 5,048,276 A | 9/1991 | Miller |
| 5,048,615 A | 9/1991 | Feldmann |
| 5,060,462 A | 10/1991 | Helfer et al. |
| 5,062,322 A | 11/1991 | Sinko |
| 5,069,022 A | 12/1991 | Vandermark |
| 5,076,042 A | 12/1991 | Koorn et al. |
| 5,085,043 A | 2/1992 | Hess et al. |
| 5,123,234 A | 6/1992 | Harada et al. |
| 5,133,174 A | 7/1992 | Parsons, Jr. |
| 5,140,249 A | 8/1992 | Linder et al. |
| 5,146,733 A | 9/1992 | Klaeger |
| 5,150,021 A | 9/1992 | Kamono et al. |
| 5,163,273 A | 11/1992 | Wojtkowski et al. |
| 5,203,147 A | 4/1993 | Long |
| 5,204,814 A | 4/1993 | Noonan et al. |
| 5,210,997 A | 5/1993 | Mountcastle, Jr. |
| 5,253,729 A | 10/1993 | Suzuki |
| 5,261,213 A | 11/1993 | Humphrey |
| 5,293,729 A * | 3/1994 | Curry et al. ............ 56/7 |
| 5,301,494 A | 4/1994 | Peot et al. |
| 5,309,699 A | 5/1994 | Ehn, Jr. |
| 5,319,368 A | 6/1994 | Poholek |
| 5,323,593 A | 6/1994 | Cline et al. |
| 5,330,138 A | 7/1994 | Schlessmann |
| 5,343,680 A | 9/1994 | Reichen et al. |
| 5,406,778 A | 4/1995 | Lamb et al. |
| 5,423,565 A | 6/1995 | Smith |
| 5,483,789 A | 1/1996 | Gummerson et al. |
| 5,540,037 A | 7/1996 | Lamb et al. |
| 5,553,445 A | 9/1996 | Lamb et al. |
| 5,623,817 A * | 4/1997 | Bricko et al. ............ 56/7 |
| 5,704,201 A | 1/1998 | Van Vleet |
| 5,775,075 A * | 7/1998 | Dannar ............ 56/15.2 |
| 5,966,912 A | 10/1999 | Swisher et al. |
| 5,970,690 A | 10/1999 | Toman |
| 6,131,378 A * | 10/2000 | Lees ............ 56/7 |
| 6,192,665 B1 | 2/2001 | Asselin et al. |
| 6,223,510 B1 | 5/2001 | Gillins et al. |
| 6,336,312 B1 | 1/2002 | Bednar et al. |
| 6,684,614 B2 | 2/2004 | Greenwell |
| 6,860,093 B2 | 3/2005 | Scordilis |
| 6,928,798 B2 | 8/2005 | Hensley et al. |
| 7,086,215 B2 | 8/2006 | Hensley et al. |

| | | |
|---|---|---|
| 2001/0037634 A1 | 11/2001 | Schick |
| 2002/0100266 A1 | 8/2002 | Greenwell |
| 2003/0140610 A1 | 7/2003 | Boyko |

FOREIGN PATENT DOCUMENTS

| | | |
|---|---|---|
| JP | 01-112913 | 5/1989 |
| JP | 02-265411 A | 10/1990 |
| JP | 04-079808 | 3/1992 |
| JP | 05-023030 | 2/1993 |
| JP | 05-095716 | 4/1993 |
| JP | 05-030834 | 9/1993 |
| JP | 06-153647 | 6/1994 |
| JP | 06-217623 | 8/1994 |
| NL | 8301411 | 11/1984 |
| WO | WO-93/12641 | 7/1993 |

OTHER PUBLICATIONS

Bengeyfield, William H.; The Good and Not so Good of Triplex Putting Green Mowers; USGA Green Section Record; Mar. 1972; pp. 25-29.
Bunton Company, Brochure on Bunton Mowers, 1986, pp. 1-20 (Exhibit 8, 20 pages).
Ferris Industries Advertisement for Ferris, Hydro Walk 36, Jan. 1991, Yard and Garden (Jan. 1991), p. 30 (Ref. 3, 1 page).
Ferris Industries, Advertisement for Hydrowalk 36/48, Jun. 1990 (Exhibit 4, 2 pages).
Ferris Industries, Brochure on Pro Cut Mower, date unknown (Exhibit 9, 4 pages).
Foy, John H.; "Ring Management"; USGA Green Section Record; p. 8.
Gravely International, Brochure for Pro Series, Sep. 1986, pp. 1-10 (Exhibit 7, 11 pages).
Hardin, Harvey; "Watch for Thatch"; USGA Green Section Record; Mar. 1972; pp. 27-28.
Ransomes America Corp., Turf Care Equipment Manual, 1994, portion of section entitled Mounted/Trailed (Exhibit2, 6 pages).
Ransomes America Corporation, Turf Care Equipment Manual, 1994, portion of section entitled Ransomes Reel (Exhibit 1, 44 pages).
Snow, James T.; The Triplex "Ring"; Nov./Dec. 1980; pp. 12-14.
The Grasshopper Co., Brochure on Model 718/718K, 1988 (Exhibit 5, 2 pages).
USGA Green Section Record; "Collar ID"; http://www.usga.org/green/ARCHIVE/Record/02/july-august/collarID.html; Mar. 9, 2004; pp. 1-4.
USGA Green Section Record; "Five-Plex Ring"; http://www.usga.org/green/archive/record/99/jul_aug/five_plex_ring.html; Mar. 9, 2004; pp. 1-3.
Walker Manufacturing Co., Owners Manual for Model MS36-42 and MC36-54, 1987, pp. 1-45 (Exhibit 6, 47 pages).
Wheel Horse, Parts and Service Manual for Dixie Chopper 5018 Magnum, date unknown (Exhibit 10, 3 pages).

* cited by examiner

ARTICULATING SWING-OUT ARM

FIELD

The present disclosure relates to lawn mowers and, more specifically, to an articulating swing-out arm for coupling a reel assembly to a reel lawn mower.

BACKGROUND

The statements in this section merely provide background information related to the present disclosure and may not constitute prior art.

Lawn mowers, in particular reel lawn mowers, can have a variety of components and configurations. For example, it is known to couple a reel assembly to a reel lawn mower with a swing-out arm. A typical swing-out arm can rotate about a single axis to position a reel assembly. However, the components and configuration of a reel lawn mower can limit the ability of such a swing-out arm to position a reel assembly. Accordingly, it would be desirable to provide an articulating swing-out arm.

SUMMARY

The present disclosure provides an articulating swing-out arm for coupling a reel assembly to a lawn mower. The swing-out arm can include a relatively rigid, elongate main member coupled to a first joint assembly proximate a first end of the main member. The first joint assembly can be adapted to be coupled the mower. Furthermore, the first joint assembly can define a substantially vertical first axis therethrough and be operable to provide for rotation of the main member relative to the mower about the first axis. The main member can also be coupled to a second joint assembly proximate a second end of the main member. The swing-out arm can further include a relatively rigid, elongate secondary member coupled to the second joint assembly proximate a first end of the secondary member. The second joint assembly can define a substantially vertical second axis therethrough and can be operable to provide for rotation of the secondary member relative to the main member about the second axis. The secondary member can be adapted to be coupled to the reel assembly proximate a second end of the secondary member, and the swing-out arm can be operable to locate the reel assembly relative to the mower in at least a mowing position and a servicing position.

The present disclosure further provides a mower. The mower can include a frame and a plurality of wheels coupled to the frame. The plurality of wheels can have at least first and second drive wheels and a steerable wheel. The first and second drive wheels can be coupled on transversely opposite sides of the frame proximate a front end of the mower, and the steerable wheel can be coupled to the frame proximate a back end of the mower. The mower can include a power unit supported by the frame and operably coupled to at least one of the first and second drive wheels for facilitating motion of the mower. The mower can further include a first reel assembly operable to perform cutting operations of the mower and an articulating swing-out arm for coupling the first reel assembly to the frame. The swing-out arm can have a relatively rigid, elongate main member coupled to a first joint assembly proximate a first end of the main member. The first joint assembly can be coupled to the frame. Furthermore, the first joint assembly can define a substantially vertical first axis therethrough and can be operable to provide for rotation of the main member relative to the frame about the first axis. The main member can also be coupled to a second joint assembly proximate a second end of the main member. The swing-out arm can further have a relatively rigid, elongate secondary member coupled to the second joint assembly proximate a first end of the secondary member. The second joint assembly can define a substantially vertical second axis therethrough and can be operable to provide for rotation of the secondary member relative to the main member about the second axis. The secondary member can also be coupled to the first reel assembly proximate a second end of secondary member. Additionally, the swing-out arm can be operable to locate the first reel assembly in at least a mowing position and a servicing position. The mowing position can be underneath the frame, longitudinally between the drive wheels and the steerable wheel, and transversely between the drive wheels. The servicing position can be outside of the frame.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
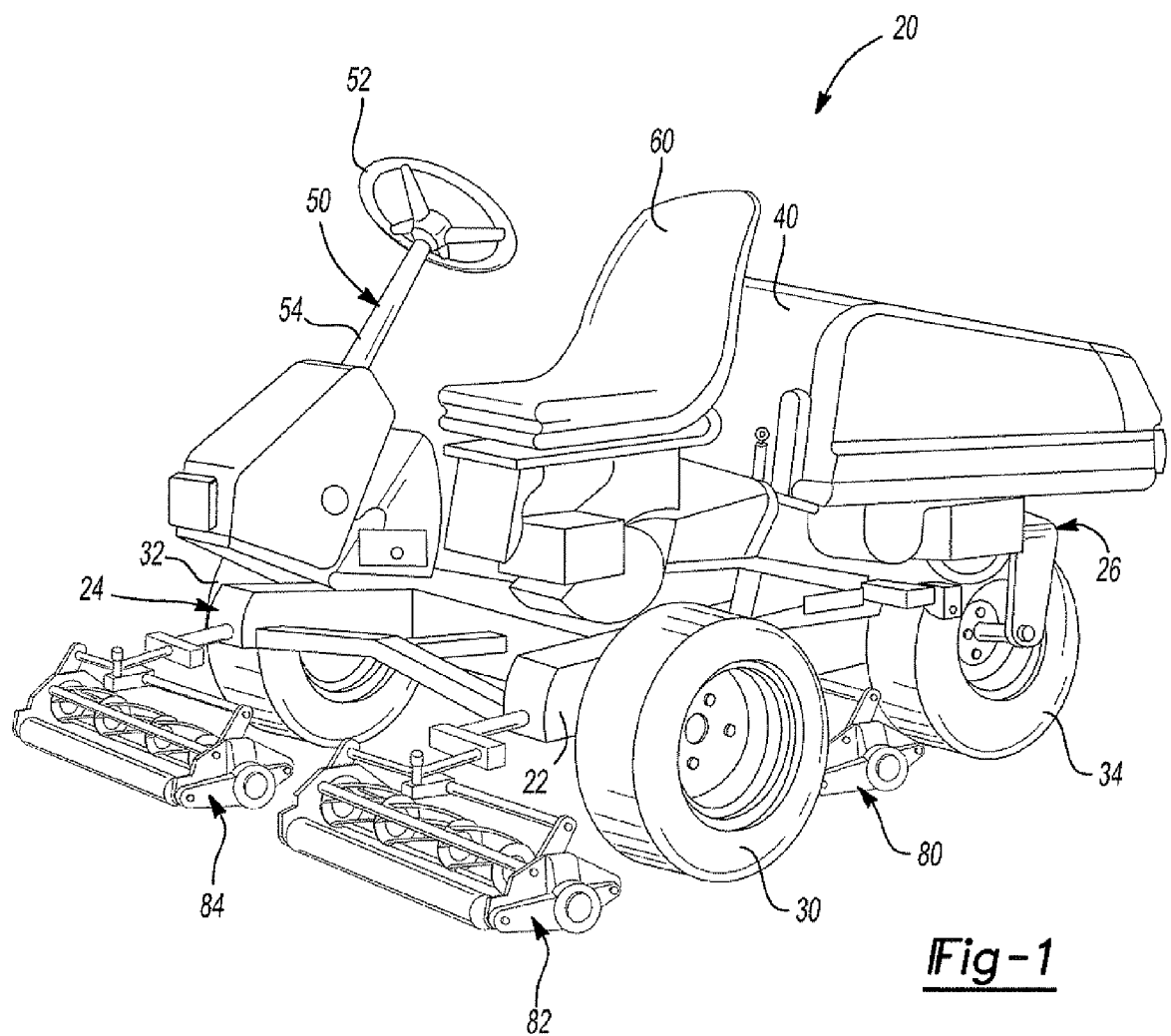
FIG. 1 is a perspective view of a lawn mower, in this case in the form of a reel lawn mower, according to the present disclosure.

The following description is merely exemplary in nature and is in no way intended to limit the present disclosure, application, or uses. Throughout this specification, like reference numerals will be used to refer to like elements. Additionally, as used herein, the term "longitudinal" refers to a direction along or substantially parallel to a fore and aft centerline of a lawn mower. Furthermore, as used herein, the term "transverse" refers to a direction substantially perpendicular to the longitudinal direction and extending across the mower. Moreover, as used herein, the term "vertical" refers to a direction substantially orthogonal to a plane defined between the longitudinal and transverse directions.

According to the principles of the present disclosure, a lawn mower, in particular a reel lawn mower, can include an articulating swing-out arm for supporting a reel assembly. The swing-out arm can include main and secondary members. The main member and the mower can be coupled to a first joint assembly. The first joint assembly can define a first axis therethrough and can be operable to provide for rotation of the main member relative to the mower about the first axis. Furthermore, the main and secondary members can be coupled to a second joint assembly. The second joint assembly can define a second axis therethrough and can be operable to provide for rotation of the secondary member relative to the main member about the second axis. The secondary member can also be coupled to the reel assembly. The swing-out arm can be operable to locate the reel assembly in at least a mowing position and a servicing position. The mowing position can be underneath the mower within an area defined between the wheels of the mower. The servicing position can be outside of the mower.

Referring to FIG. 1, an exemplary lawn mower 20, in this case in the form of a riding reel lawn mower, according to the principles of the present invention is shown. Mower 20 can be supported by a frame 22. Frame 22 can be relatively rigid and can extend between a front end 24 and a rear end 26 of mower 20. Mower 20 can have a plurality of wheels rotatably coupled to frame 22. For example, mower 20 can include first and second drive wheels 30, 32 rotatably coupled to frame 22 proximate front end 24. Mower 20 can also include a steerable wheel 34 coupled to rear end 26.

Mower 20 can further include a power unit 40 supported by frame 22 proximate rear end 26. According to the present disclosure, power unit 40 can be an internal combustion engine or an electric or hydraulic motor, by way of non-limiting example. Power unit 40 can be operably coupled to drive wheels 30, 32 by a transmission (not shown) to provide for forward and reverse movement of mower 20.

Mower 20 can also include a steering mechanism 50 supported by frame 22. Steering mechanism 50 can have a variety of components such as a steering wheel 52 and a support assembly 54. Steering mechanism 50 can be operably coupled to steerable wheel 34 to guide mower 20 during movement. Mower 20 can also include a seat 60 coupled to frame 22. Seat 60 can support an operator of mower 20, and steering mechanism 50 can be positioned to be accessible to an operator in seat 60.

Mower 20 can also include one or more reel assemblies. A center reel assembly 80 can be coupled to frame 22 and can be selectively positioned underneath mower 20 within an area defined between drive wheels 30, 32 and steerable wheel 34, as described in further detail herein. First and second front reel assemblies 82, 84 can be coupled to frame 22 proximate front end 24 of mower 20 transversely adjacent to each other and longitudinally forward of drive wheels 30, 32.

Reel assemblies 80, 82, 84 can all be similar and can all have a variety of structures and components. The components thereof can be conventionally constructed and can include a variety of materials. For example, referring to FIG. 6, center reel assembly 80 can include a reel deck 90 and a lift arm 92. Reel deck 90 can perform cutting operations of mower 20 and can include such parts as blades and bedknives (not shown) used during the cutting operations. Lift arm 92 can vertically position reel deck 90 in coordination with the cutting operations of mower 20.

As shown in FIGS. 2-6, mower 20 can include an articulating swing-out arm 100 for coupling center reel assembly 80 to frame 22. Swing-out arm 100 can include a main member 110 rotatably coupled to frame 22 and a secondary member 112 rotatably coupled to main member 110. Main and secondary members 110, 112 can be relatively rigid and can have an elongate shape. Furthermore, main and secondary members 110, 112 can be made of square steel tubing.

Figure 5:
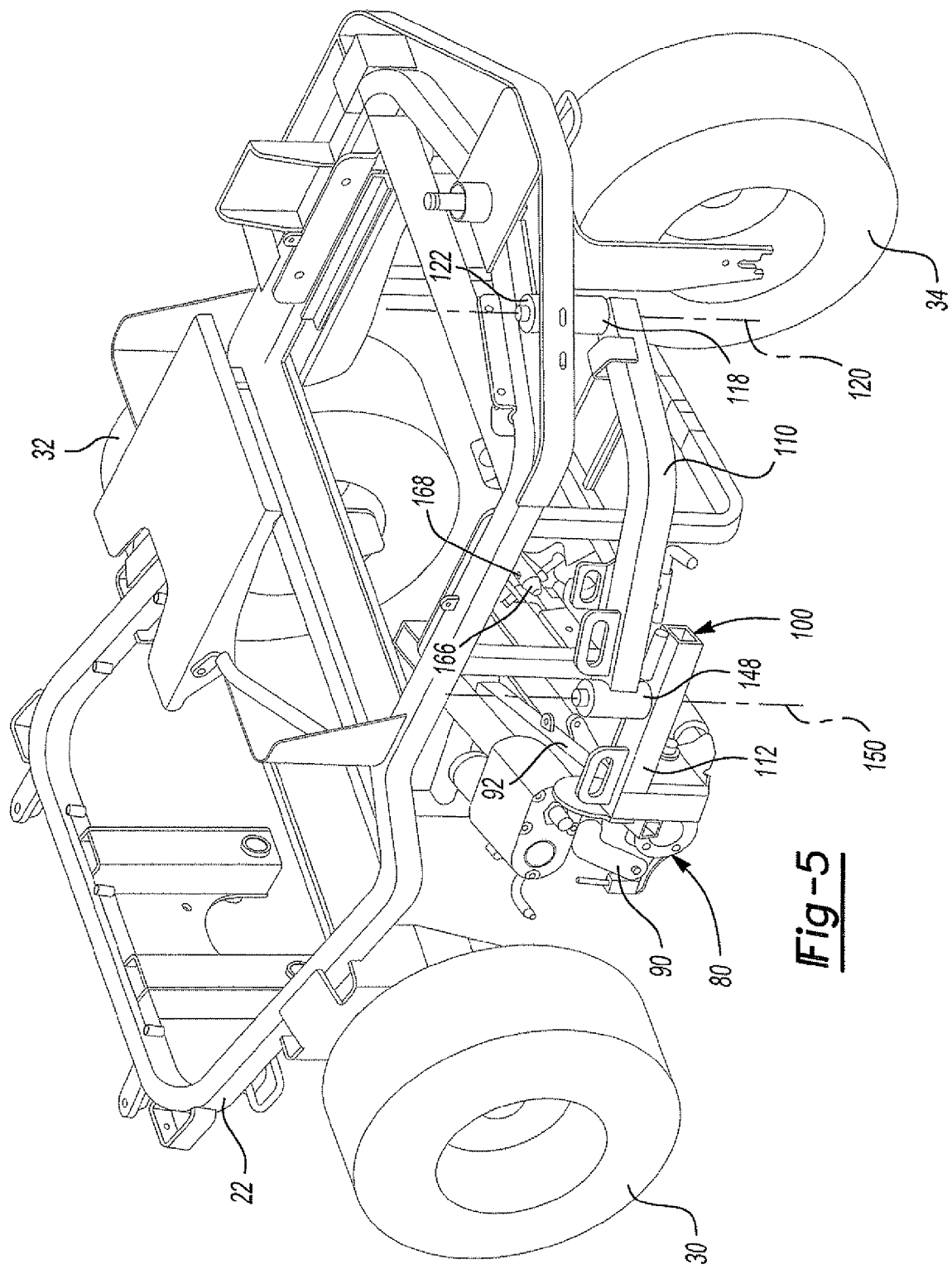
FIG. 5 is a perspective view of the assembly of FIG. 4 with the swing-out arm positioning the reel assembly partially out from underneath the frame.

Referring to FIG. 5, main member 110 can be rotatably coupled to frame 22 at a first joint or pivot assembly 118. First joint assembly 118 can support swing-out arm 100 from frame 22 and can provide for rotation of main member 110 relative to frame 22 about a first axis 120 defined therethrough. First axis 120 can extend in a substantially vertical direction.

Figure 2:
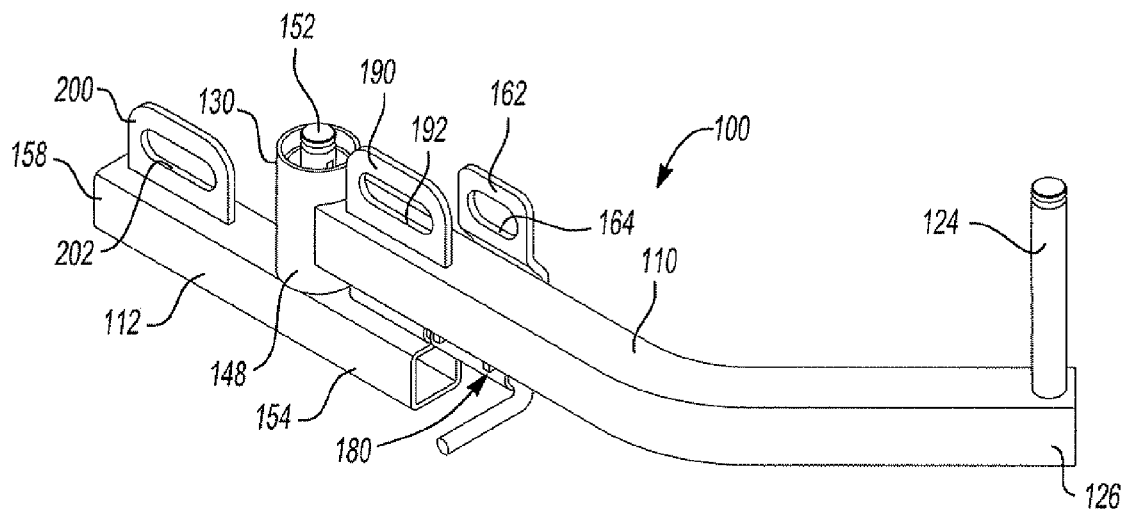
FIG. 2 is a perspective view of a swing-out arm for a reel lawn mower according to the present disclosure.
Figure 3:
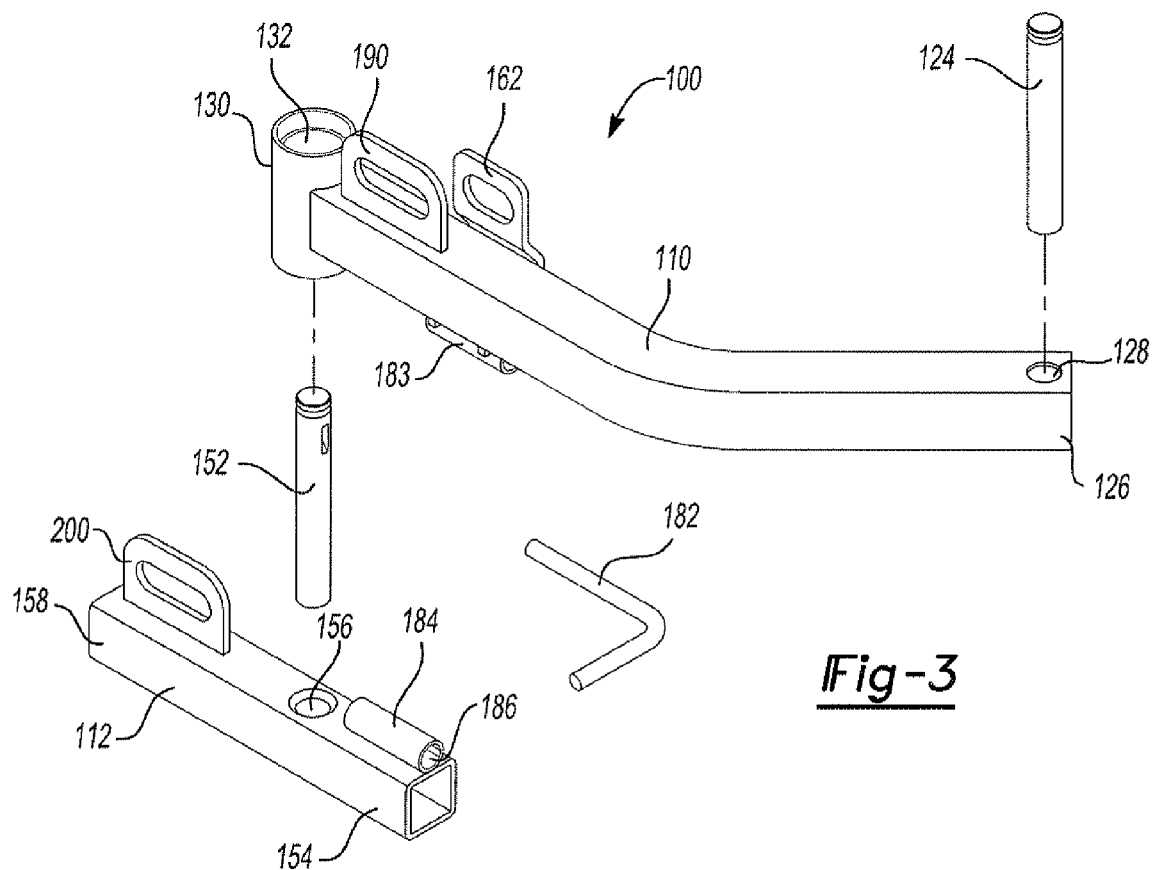
FIG. 3 is an exploded perspective view of the swing-out arm of FIG. 2.

First joint assembly 118 can be conventionally constructed and can include a variety of components such as a cylindrical housing 122 attached to frame 22. With further reference to FIGS. 2-3, first joint assembly 118 can also include a first rod 124 rotatably coupled within cylindrical housing 122. First rod 124 can be attached to main member 110 proximate a first end 126 of main member 110. Main member 110 can include an aperture 128 proximate first end 126 for positioning first rod 124.

Furthermore, main member 110 can include a cylindrical end 130 opposite first end 126. Cylindrical end 130 can have an aperture 132 therethrough. Main member 110 can also be complementarily contoured with respect to frame 22 and other components of mower 20.

Referring to FIGS. 2 and 5, secondary member 112 can be rotatably coupled to main member 110 at a second joint or pivot assembly 148. Second joint assembly 148 can support secondary member 112 from main member 110 and can provide for rotation of secondary member 112 relative to main member 110 about a second axis 150 defined through second joint assembly 148. Second axis 150 can extend in a substantially vertical direction. The rotation of secondary member 112 about second axis 150 can be independent of the rotation of main member 110 about first axis 120.

Second joint assembly 148 can be conventionally constructed and can include can include a variety of components such as cylindrical end 130 of main member 110. Furthermore, second joint assembly 148 can include a second rod 152 rotatably coupled within aperture 132 of cylindrical end 130 and attached to secondary member 112 proximate a first end 154 of secondary member 112. Secondary member 112 can also include an aperture 156 proximate first end 154 for positioning second rod 152.

Figure 6:
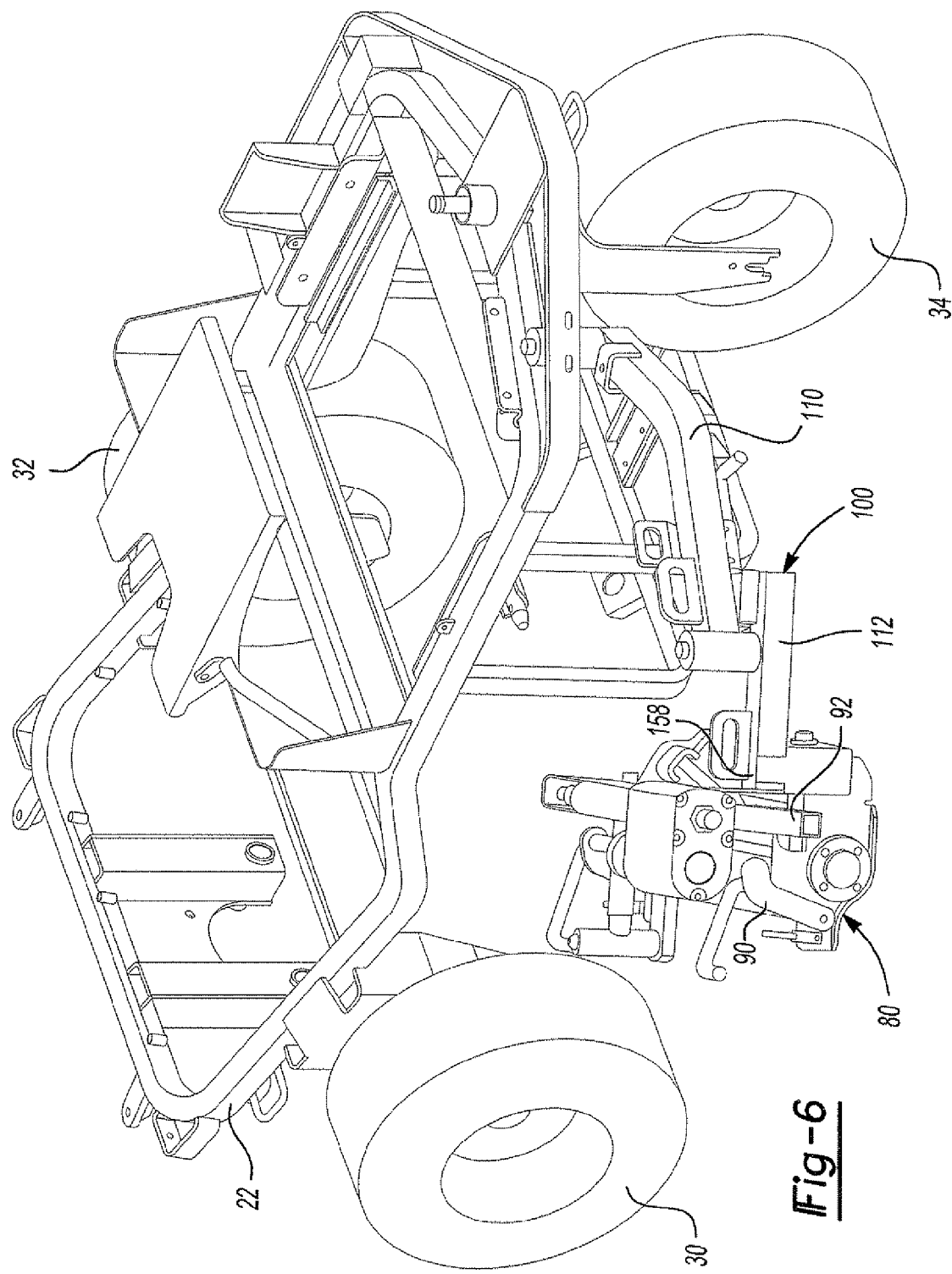
FIG. 6 is a perspective view of the assembly of FIG. 4 with the swing-out arm positioning the reel assembly outside of the frame in a servicing position.

Furthermore, referring to FIG. 6, swing-out arm 100 can be attached to center reel assembly 80. In particular, lift arm 92 of center reel assembly 80 can be fixed to secondary member 112 of swing-out arm 100 proximate a second end 158 of secondary member 112. Thus, lift arm 92 can vertically position reel deck 90 relative to secondary member 112.

Figure 4:
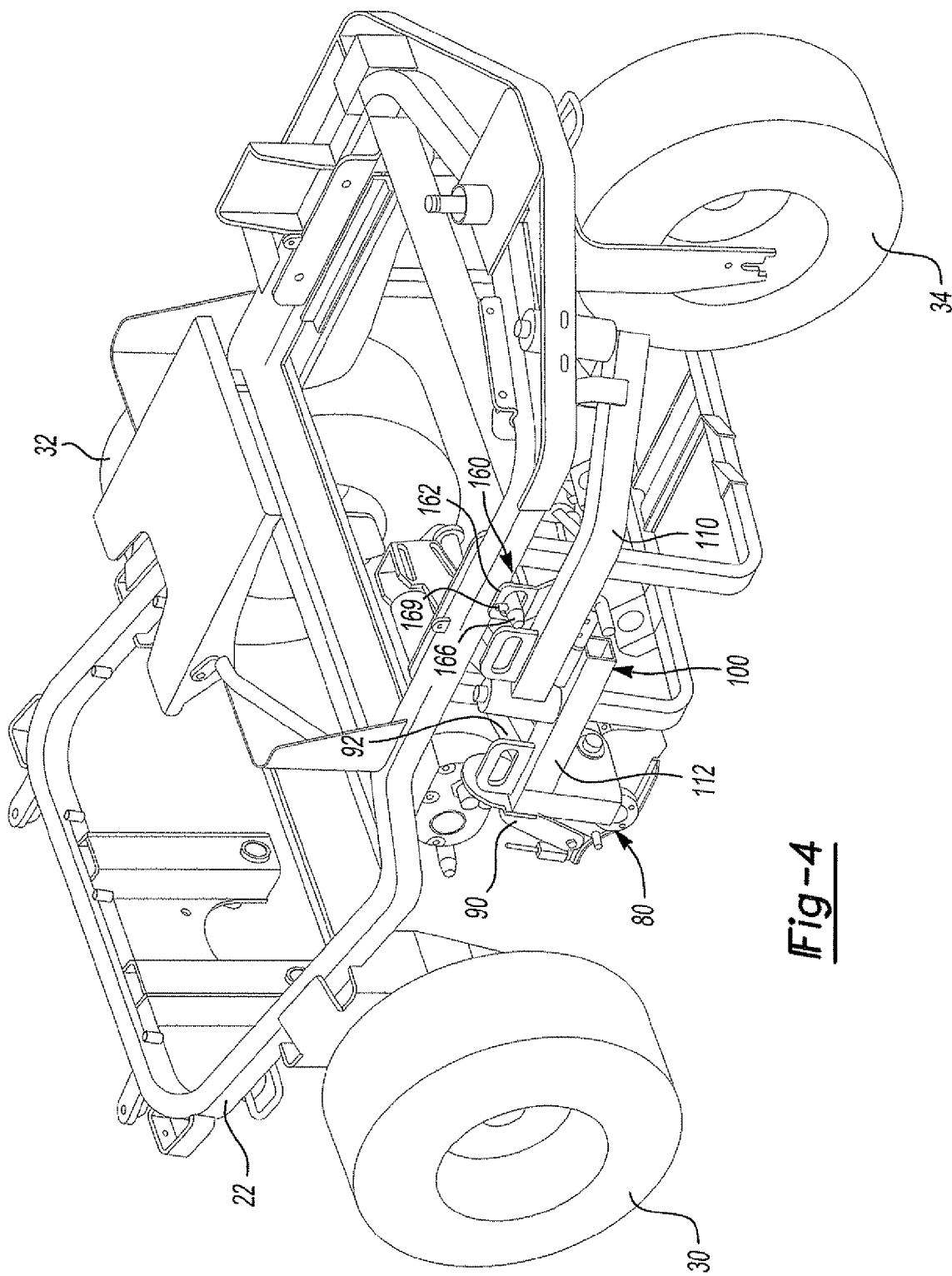
FIG. 4 is a perspective view of an assembly having a frame for a reel lawn mower and a swing-out arm attached thereto, the swing-out arm attached to a reel assembly and positioning the reel assembly in a mowing position according to the present disclosure.

Swing-out arm 100 can further include one or more locking mechanisms. Referring to FIG. 4, a first locking mechanism 160 can be coupled between main member 110 and frame 22 for selectively fixing or locking main member 110 relative to frame 22. First locking mechanism 160 can include a bracket 162 secured to main member 110. Bracket 162 can have an aperture 164 (FIG. 2) extending therethrough. First locking mechanism 160 can also include a shaft or other similar component 166 secured to frame 22. Shaft 166 can be sized to fit within aperture 164 of bracket 162 and can have an aperture 168 (FIG. 5) for receiving a pin 169. When main member is positioned so that shaft 166 extends into aperture 164, pin 169 can extend into aperture 168, engage shaft 166 and bracket 162, and thereby fix the rotation of main member 110 relative to frame 22. Bracket 162 and shaft 166 can be made of relatively rigid materials and can be conventionally constructed. Pin 169 can also be conventionally constructed and have a variety of configurations.

Referring to FIGS. 2-3, swing-out arm 100 can also include a second locking mechanism 180 between main member 110 and secondary member 112 for selectively fixing the rotation of secondary member 112 relative to main member 110. Second locking mechanism 180 can include an L-shaped latch 182 slidably coupled to main member 110 within a first sleeve 183. Second locking mechanism 180 can also include a second sleeve 184 secured to secondary member 112, and second sleeve 184 can have an aperture 186 for receiving latch 182. Secondary member 112 can be rotated relative to main member 110 so that latch 182 and second sleeve 184 are aligned, and latch 182 can slide into aperture 186 and engage with second sleeve 184 to fix the rotation of secondary member 112 relative to main member 110. Additionally, latch 182 and sleeves 183, 184 can be conventionally constructed from relatively rigid materials.

Swing-out arm 100 can also include one or more handles. Swing-out arm 100 can include a first handle 190 secured to main member 110 proximate cylindrical end 130. First handle 190 can have an aperture 192 therethrough to allow for the grip of an operator. Furthermore, swing-out arm 100 can include a second handle 200 secured to secondary member 112 proximate second end 158. Similar to first handle 190, second handle 200 can have an aperture 202 therethrough to allow for the grip of an operator. Therefore, an operator can grip one or more of handles 190, 200 to rotate one or more of main and secondary members 110, 112. Additionally, handles 190, 200 can be conventionally constructed from a relatively rigid material such as steel.

Referring to FIGS. 4-6, swing-out arm 100 can be operable to move center reel assembly 80 within at least a two-dimensional area including a mowing position and a servicing position. The two-dimensional area can be defined by the combination of the rotation of main member 110 relative to frame 22 about first axis 120 and the rotation of secondary member 112 relative to main member 110 about second axis 150. According to the present disclosure, an operator can grip one or more of handles 190, 200 and can manipulate one or more of main and secondary members 110, 112 to move center reel assembly 80 within the two-dimensional area, as described below.

As shown in FIG. 4, the mowing position of center reel assembly 80 can be vertically underneath frame 22, longitudinally between drive wheels 30, 32 and steerable wheel 34, and transversely between drive wheels 30, 32. Furthermore, when center reel assembly 80 is positioned in the mowing position, center reel assembly 80 can be longitudinally rearward of front reel assemblies 82, 84 and transversely in between front reel assemblies 82, 84. With center reel assembly 80 in the mowing position, first and second locking mechanisms 160, 180 can be engaged to fix the rotations of main and secondary members 110, 112, as described above. Thereby, swing-out arm 100 and center reel assembly 80 can be secured in place, and mower 20 can be in condition to perform cutting operations.

Swing-out arm 100 can be operated to move center reel assembly from the mowing position. Initially, first and second locking mechanisms 160, 180 can be disengaged to allow for rotation of main member 110 about first axis 120 and rotation of secondary member 112 about second axis 150. Next, as shown in FIG. 5, secondary member 112 can be rotated inwardly about second axis 150, thereby moving center reel assembly 80 toward rear end 26 of mower 20 to a position to clear first drive wheel 30. Contemporaneously, main member 110 can be rotated outwardly about first axis 120, thereby moving center reel assembly 80 out from an area between wheels 30, 32, 34 as described above to an area outside of frame 22. With center reel assembly 80 outside of frame 22, center reel assembly 80 can be rotated outwardly around second axis 150 to the servicing position shown in FIG. 6.

When center reel assembly 80 is in the servicing position, a variety of maintenance tasks can be performed on mower 20. For example, blades (not shown) of center reel assembly 80 can be sharpened or replaced. Additionally, a bed knife (not shown) of center reel assembly 80 can be replaced. Furthermore, other components of mower 20 underneath frame 22 can be accessible for servicing.

Swing-out arm 100 can be operated to return center reel assembly 80 to the mowing position by performing the above steps in reverse. Furthermore, swing-out arm 100 can also be operated to locate center reel assembly 80 in a variety of positions not shown in the figures within the two-dimensional area defined by the combination of the independent rotations of main member 110 about first axis 120 and secondary member 112 about second axis 150.

The present disclosure can vary in many ways. A lawn mower according to the present disclosure can have a variety of configurations and components. For example, a lawn mower according to the present disclosure can have one or more axles and can include a varying number of reel assemblies. Furthermore, a reel assembly can also have a variety of configurations and components. Moreover, a swing-out arm according to the present disclosure can have a variety of configurations and components and can be made from a variety of relatively rigid materials. For example, as described above, the joint or pivot assemblies of a swing-out arm according to the present disclosure can have a variety of configurations and components. The locking mechanisms can also have a variety of configurations and components. For example, the pin of the first locking mechanism can be a click pin, roll pin, cotter pin, or bolt, by way of non-limiting example. Additionally, the mowing and servicing positions can vary according to the present disclosure. Thus, the description herein is merely exemplary in nature and variations that do not depart from the gist of that which is described are intended to be within the scope of the disclosure. Such variations are not to be regarded as a departure from the spirit and scope of the disclosure.

What is claimed is:

1. An articulating swing-out arm for coupling a reel assembly to a lawn mower, the swing-out arm comprising:
    a relatively rigid, elongate main member coupled to a first joint assembly proximate a first end of the main member, the first joint assembly being adapted to be coupled with the mower, the first joint assembly defining a substantially vertical first axis therethrough and being operable to provide for rotation of the main member relative to the mower about the first axis, the main member being coupled to a second joint assembly proximate a second end of the main member;
    a relatively rigid, elongate secondary member coupled to the second joint assembly proximate a first end of the secondary member, the second joint assembly defining a substantially vertical second axis therethrough and being operable to provide for rotation of the secondary member relative to the main member about the second axis,
    wherein the secondary member is adapted to be coupled to the reel assembly proximate a second end of the secondary member, and the swing-out arm is operable to locate the reel assembly relative to the mower in at least a mowing position and a servicing position, and
    at least one locking mechanism including a receiver and a latch slidingly operable to be inserted into and removable from an aperture of the receiver for selectively fixing at least one of the rotation of the main member and the rotation of the secondary member.

2. The swing-out am, of claim 1, wherein the at least one locking mechanism comprises a first locking mechanism adapted to be coupled between the main member and the mower for selectively fixing the rotation of the main member relative to the mower and a second locking mechanism coupled between the main and secondary members for selectively fixing the rotation of the secondary member relative to the main member.

3. The swing-out arm of claim 2, wherein the first locking mechanism includes a bracket secured to the main member, the bracket having an aperture therein, the first locking mechanism being selectively operable to engage the bracket with a complementary component of the mower to fix the rotation of the main member relative to the mower.

4. The swing-out arm of claim 2, wherein the second locking mechanism includes a latch, a first sleeve secured to the main member, and a second sleeve secured to the secondary member, the second locking mechanism being selectively operable to engage the latch with the first and second sleeves to fix the rotation of the secondary member relative to the main member.

5. The swing-out arm of claim 1, further comprising at least one handle to provide for the grip of an operator.

6. The swing-out arm of claim 5, comprising a first handle attached to the main member and a second handle attached to the secondary member.

7. The swing-out arm of claim 1, wherein the main and secondary members include steel tubing.

8. The swing-out arm of claim 1, wherein the main member has a contoured shape adapted to be complementary to the mower.

9. A mower comprising:
a frame;
a plurality of wheels rotatably coupled to the frame, the plurality of wheels including at least first and second drive wheels and a steerable wheel, the first and second drive wheels being coupled on transversely opposite sides of the frame proximate a front end of the mower, the steerable wheel being coupled to the frame proximate a back end of the mower;
a power unit supported by the frame and operably coupled to at least one of the first and second drive wheels for facilitating motion of the mower;
a first reel assembly operable to perform cutting operations of the mower; and
an articulating swing-out arm for coupling the first reel assembly to the frame, the swing-out arm including:
a relatively rigid, elongate main member coupled to a first joint assembly proximate a first end of the main member, the first joint assembly being coupled to the frame, the first joint assembly defining a substantially vertical first axis therethrough and being operable to provide for rotation of the main member relative to the frame about the first axis, the main member being coupled to a second joint assembly proximate a second end of the main member, and
a relatively rigid, elongate secondary member coupled to the second joint assembly proximate a first end of the secondary member, the second joint assembly defining a substantially vertical second axis therethrough and being operable to provide for rotation of the secondary member relative to the main member about the second axis, the secondary member being coupled to the first reel assembly proximate a second end of secondary member,
wherein the swing-out arm is operable to locate the first reel assembly in at least a mowing position and a servicing position, the mowing position being underneath the frame, longitudinally between the drive wheels and the steerable wheel, and transversely between the drive wheels, the servicing position being outside of the frame.

10. The swing-out arm of claim 9, further comprising at least one locking mechanism for selectively fixing at least one of the rotation of the main member relative to the frame and the rotation of the secondary member relative to the main member.

11. The swing-out arm of claim 10, comprising a first locking mechanism coupled between the main member and the mower for selectively fixing the rotation of the main member relative to the mower and a second locking mechanism coupled between the main and secondary members for selectively fixing the rotation of the secondary member relative to the main member.

12. The swing-out arm of claim 11, wherein the first locking mechanism includes a bracket secured to the main member and a shaft secured to the frame, the bracket having an aperture therein adapted to receive the shaft, the first locking mechanism further including a pin selectively operable to engage the shaft and bracket to fix the rotation of the main member relative to the mower.

13. The mower of claim 9, further comprising second and third reel assemblies coupled adjacent one another to the frame proximate the front end of the mower.

14. The mower of claim 13, wherein the mowing position of the first reel assembly is longitudinally rearward of the second and third reel assemblies and transversely between the second and third reel assemblies.

15. The mower of claim 9, wherein the main member of the swing-out arm is complementarily contoured with respect to the back end of the mower.

16. The mower of claim 9, wherein the first reel assembly includes a reel deck for performing cutting operations and a lift arm for vertically positioning the reel deck in coordination with the cutting operations.

* * * * *